United States Patent [19]

Tanoi

[11] Patent Number: 5,640,117

[45] Date of Patent: *Jun. 17, 1997

[54] DIGITAL SIGNAL TRANSMISSION CIRCUIT

[75] Inventor: Satoru Tanoi, Tokyo, Japan

[73] Assignee: Oki Electric Industry Co., Ltd., Tokyo, Japan

[*] Notice: The term of this patent shall not extend beyond the expiration date of Pat. No. 5,559,462.

[21] Appl. No.: 596,871

[22] Filed: Feb. 13, 1996

Related U.S. Application Data

[63] Continuation of Ser. No. 317,245, Oct. 3, 1994, Pat. No. 5,559,462.

[30] Foreign Application Priority Data

Oct. 5, 1993 [JP] Japan ................................ 5-249164

[51] Int. Cl.$^6$ .................................................. H03H 11/16
[52] U.S. Cl. ........................... 327/231; 327/263; 327/415; 327/416
[58] Field of Search ............................ 327/231, 263, 327/415–16

[56] References Cited

U.S. PATENT DOCUMENTS

| 5,003,537 | 3/1991 | Sager ........................................ | 327/263 |
| 5,172,397 | 12/1992 | Llewellyn ................................ | 327/263 |

FOREIGN PATENT DOCUMENTS

| 0 232 626 | 8/1987 | European Pat. Off. . |
| 0 272 956 | 6/1988 | European Pat. Off. . |
| 0 407 956 | 1/1991 | European Pat. Off. . |
| 5-22270 | 1/1993 | Japan . |

*Primary Examiner*—Margaret Rose Wambach

[57] ABSTRACT

A digital signal transmission circuit for transmitting an input pulse signal to receiving circuits through transmission lines. The digital signal transmission circuit is provided with a phase converting circuit for outputting a first output signal and a second output signal delayed in phase with respect to the first output signal according to the input of the pulse signal, a first transmission line included in the transmission lines, for transmitting the first output signal, a second transmission line included in the transmission lines, for transmitting the second output signal, and a pair of phase decoding circuits for receiving the first and second output signals from the first and second transmission lines and outputting pulse signals according to the state of reception of the first and second output signals. Thus, pulse signals to be transmitted can be restored based on a difference in delay between the first and second output signals received by the phase decoding circuits so that high-accuracy digital signal transmission is performed.

15 Claims, 14 Drawing Sheets

5,640,117

DIGITAL SIGNAL TRANSMISSION CIRCUIT

This is a continuation of application Ser. No. 08/317,245 filed Oct. 3, 1994 now U.S. Pat. No. 5,559,462.

BACKGROUND OF THE INVENTION

This invention relates to a circuit suitable for use in a semiconductor integrated circuit, for transmitting digital signals, and particularly to a digital signal transmission circuit for transmitting pulse signals used to specify operating timing.

1. Description of the Related Art

As a conventional digital signal transmission circuit, there is known one disclosed in Japanese Patent Application Laid-Open Publication No. 5-22270, for example.

Transmission lines used for transmitting clock signals have been described in the disclosure. The transmission lines are respectively electrically connected to a plurality of flip-flops. The flip-flops are activated in response to clock signals transmitted through the transmission lines.

It has recently become desirable to have a semiconductor integrated circuit that can provide low power consumption, high accuracy and high-speed operations. It has therefore been desirable to reduce an influence of load resistances and load capacitances produced due to the connection between the transmission lines and receiving circuits such as the flip-flops upon the transmission lines.

SUMMARY OF THE INVENTION

It is an object of the present invention to provide a circuit for transmitting digital signals with high accuracy.

It is another object of the present invention to provide a circuit for transmitting digital signals at a high speed.

It is a further object of the present invention to provide a circuit for transmitting digital signals with low power consumption.

According to one aspect of the invention, for achieving the above objects, there is provided a digital signal transmission circuit for transmitting an input pulse signal to receiving circuits through transmission lines, comprising a phase converting circuit for outputting a first output signal and a second output signal delayed in phase with respect to the first output signal according to the input of the pulse signal; a first transmission line included in the transmission lines, for transmitting the first output signal; a second transmission line included in the transmission lines, for transmitting the second output signal; and phase decoding circuits for receiving the first and second output signals from the first and second transmission lines and outputting pulse signals according to the state of reception of the first and second output signals, whereby the pulse signals to be transmitted can be restored based on a difference in delay between the first and second output signals received by the phase decoding circuits so that high-accuracy digital signal transmission is performed.

BRIEF DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

DETAILED DESCRIPTION OF THE PREFERRED EMBODIMENTS

Figure 1:
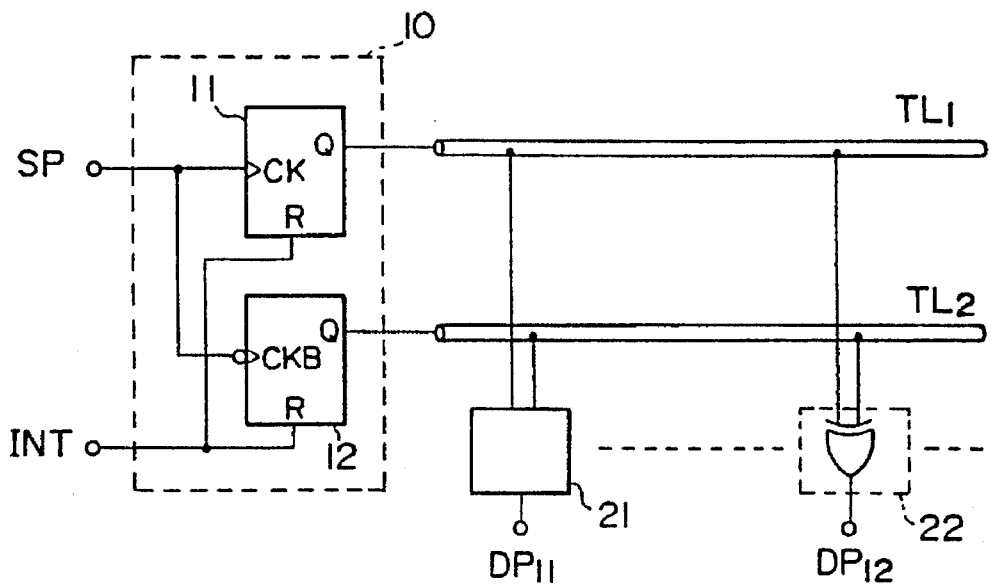
FIG. 1 is a circuit diagram showing a first embodiment of a digital signal transmission circuit according to the present invention.

Digital signal transmission circuits according to the invention of the present application will hereinafter be described with reference to the accompanying drawings. FIG. 1 is a circuit diagram showing a first embodiment of a digital signal transmission circuit according to the present invention.

In FIG. 1, the digital signal transmission circuit comprises a phase converting circuit 10, two transmission lines $TL_1$ and $TL_2$ and phase decoding circuits 21 and 22. The phase converting circuit 10 is made up of two flip-flops 11 and 12. The flip-flop 11 is of a positive edge T-type flip-flop and has a clock terminal CK, a reset terminal R and an output terminal Q. The clock terminal CK receives a pulse signal SP and the reset terminal R receives a reset signal INT used for performing initial setup. Further, the output terminal Q is electrically connected to the transmission line $TL_1$. The flip-flop 12 is of a negative edge T-type flip-flop and has a clock terminal CK, a reset terminal R and an output terminal Q. The clock terminal CK receives the pulse signal SP and the reset terminal R receives the reset signal INT. Further, the output terminal Q is electrically connected to the transmission line $TL_2$.

Each of the phase decoding circuits 21 and 22 is made up of an exclusive-OR circuit (hereinafter called "EXOR") activated based on two input signals. The EXORs respectively receive the signals transmitted through the transmission lines $TL_1$ and $TL_2$ therein. Output signals $DP_{11}$ and $DP_{12}$ each corresponding to the result of exclusive ORing of these inputs are output to predetermined receiving circuits. The output signals $DP_{11}$ and $DP_{12}$ are used as signals for driving the receiving circuits.

Figure 2:
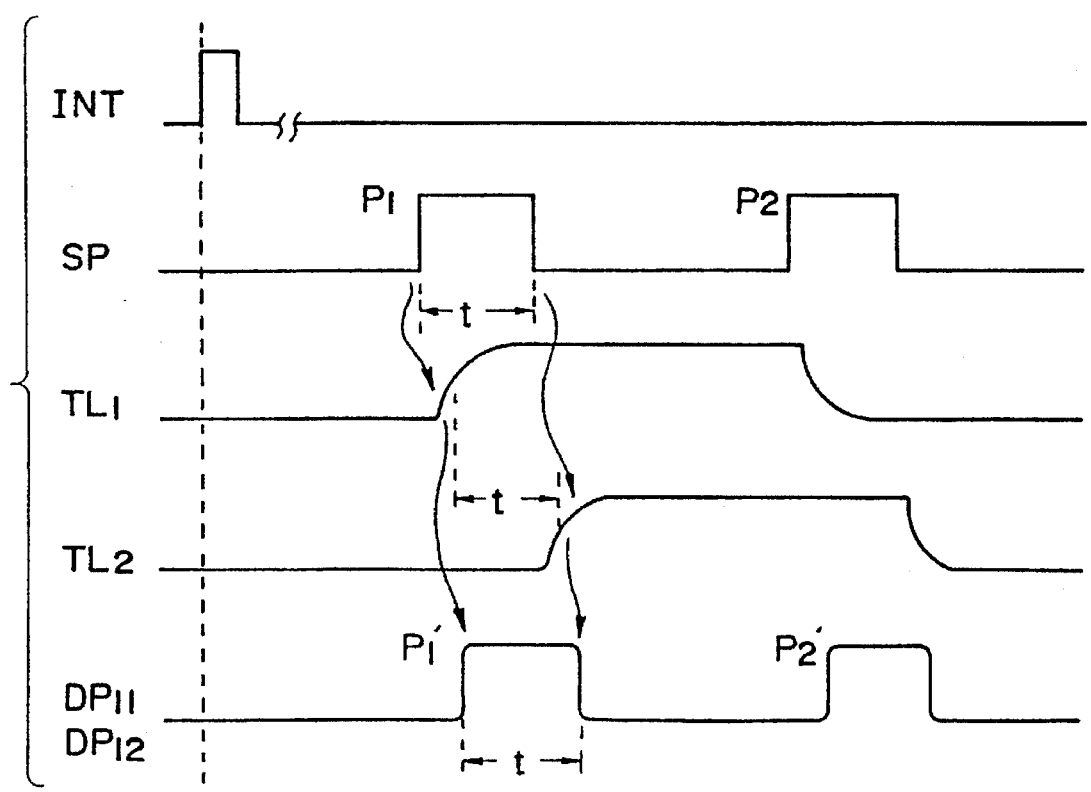
FIG. 2 is a timing chart for describing the operation of the digital signal transmission circuit shown in FIG. 1.

The operation of the digital signal transmission circuit shown in FIG. 1 will now be described with reference to the accompanying drawings. FIG. 2 is a timing chart for describing the operation of the digital signal transmission circuit shown in FIG. 1.

A pulse signal having a narrow pulse width is first input to each of the reset terminals R of the flip-flops 11 and 12 as the reset signal INT. Thus, since the flip-flops 11 and 12 are initialized, signals whose voltage values are low voltage levels (hereinafter called "low levels") are output from the output terminals Q and Q. The transmission lines $TL_1$ and $TL_2$ respectively transmit the signals whose voltage values are low in level each time the signals are output from the output terminals Q and Q of the flip-flops 11 and 12. Accordingly, voltage values of the output signals $DP_{11}$ and $DP_{12}$ of the phase decoding circuits 21 and 22 are both low in level. Thereafter, a first pulse signal $P_1$ is input to the clock terminal CK as the pulse signal SP. A voltage value of a signal output from the output terminal Q of the flip-flop 11 changes from the low level to a high voltage level (hereinafter called a "high level") in response to the rising edge of the pulse signal $P_1$. The voltage value of the signal transmitted through the transmission line $TL_1$ is also brought to the high level in response to such a change in the level of the signal output from the output terminal Q of the flip-flop 11. Since, at this time, the voltage value of the signal output from the output terminal Q of the flip-flop 12 is maintained at the low level, the voltage value of the signal transmitted through the transmission line $TL_2$ remains at the low level. This is because the flip-flop 12 responds to the falling edge of the pulse signal SP. Thus, the voltage values of the output signals $DP_{11}$ and $DP_{12}$ produced from the phase decoding circuits 21 and 22 are both brought to a high level according to a change in the voltage level of the transmission line $TL_1$. After a predetermined time interval t corresponding to a pulse width of the pulse signal $P_1$ has elapsed, the voltage value of the signal produced from the output terminal Q of the flip-flop 12 changes from the low level to the high level in response to the falling edge of the pulse signal $P_1$. The voltage value of the signal transmitted through the transmission line $TL_2$ is also brought to the high level in response to such a change in the level of the signal output from the output terminal Q of the flip-flop 12. Since, at this time, the voltage value of the signal output form from the output terminal Q of the flip-flop 11 is maintained at the high level, the voltage value of the signal transmitted through the transmission line $TL_1$ remains at the high level. Thus, the voltage values of the output signals $DP_{11}$ and $DP_{12}$ produced from the phase decoding circuits 21 and 22 are both brought to the high level according to a change in the voltage level of the transmission line $TL_2$. As a result, each of the output signals $DP_{11}$ and $DP_{12}$ of the phase decoding circuits 21 and 22 is changed so as to generate a pulse signal $P_{1'}$ having a pulse width substantially identical to that of the pulse signal $P_1$. The generation of the pulse signal $P_{1'}$ can be done within the order of a slight delay corresponding to a response speed of each of the flip-flops 11 and 12 as compared with the generation of the pulse signal $P_1$.

Further, a second pulse signal P2 is input to the clock terminal CK as the pulse signal SP. A voltage value of a signal output from the output terminal Q of the flip-flop 11 changes from the high level to the low level in response to the rising edge of the pulse signal $P_2$. The voltage value of the signal transmitted through the transmission line $TL_1$ is also brought to the low level in response to such a change in the level of the signal output from the output terminal Q of the flip-flop 11. Since, at this time, the voltage value of the signal output from the output terminal Q of the flip-flop 12 is maintained at the high level, the voltage value of the signal transmitted through the transmission line $TL_2$ remains at the high level. Thus, the voltage values of the output signals $DP_{11}$ and $DP_{12}$ produced from the phase decoding circuits 21 and 22 are both brought to a high level according to a change in the voltage level of the transmission line $TL_1$. After a predetermined time interval t corresponding to a pulse width of the pulse signal $P_2$ has elapsed, the voltage value of the signal produced from the output terminal Q of the flip-flop 12 changes from the high level to the low level in response to the falling edge of the pulse signal $P_2$. The voltage value of the signal transmitted through the transmission line $TL_2$ is also brought to the high level in response to such a change in the level of the signal output from the output terminal Q of the flip-flop 12. Since, at this time, the voltage value of the signal output from the output terminal Q of the flip-flop 32 is maintained at the high level, the voltage value of the signal transmitted through the transmission line $TL_1$ remains at the high level. Thus, the voltage values of the output signals $DP_{11}$ and $DP_{12}$ produced from the phase decoding circuits 21 and 22 are both brought to the low level according to a change in the voltage level of the transmission line $TL_2$. As a result, each of the output signals $DP_{11}$ and $DP_{12}$ of the phase decoding circuits 21 and 22 is changed so as to generate a pulse signal $P_{2'}$ having a pulse width substantially identical to that of the pulse signal $P_2$. The generation of the pulse signal $P_{2'}$ can be done within the order of a slight delay corresponding to a response speed of each of the flip-flops 11 and 12.

Since the receiving circuits are electrically connected to the digital signal transmission circuit as described above, the pulse signals are not directly transmitted to transmission lines each having a large load resistance and a large load capacitance. The phase converting circuit 10 generates two signals which are respectively out of phase with the pulse signals to be transmitted. The generated two signals are transmitted through the transmission lines different from each other. Each of the phase decoding circuits detects a difference in phase between the two signals and generates a pulse signal having a pulse width corresponding to the phase difference. Namely, deteriorations in the waveforms of the signals transmitted through the transmission lines, which occur due to the load resistance and the load capacitance, become the same degree. However, the difference in phase between the signals transmitted through the transmission lines is less affected by the load resistance and the load capacitance. Thus, the pulse signals having the pulse widths substantially identical to those of the pulse signals to be transmitted can be sent to their corresponding receiving circuits. Further, since the pulse signals to be transmitted are received by the phase converting circuit 10, pulse signals whose pulse widths are short can also be reliably sent to the receiving circuits without any waveform degradation.

A second embodiment will now be described below with reference to the accompanying drawings.

Figure 3:
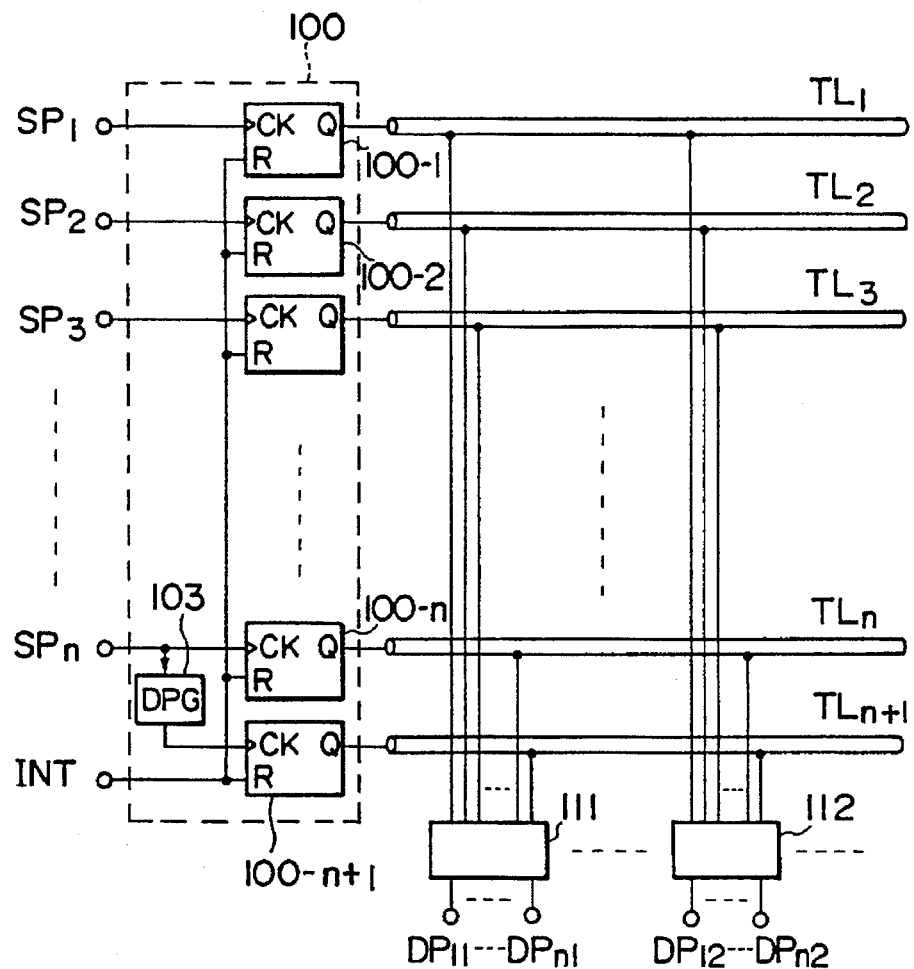
FIG. 3 is a circuit diagram illustrating a second embodiment of a digital signal transmission circuit according to the present invention.

FIG. 3 is a circuit diagram showing the second embodiment of a digital signal transmission circuit according to the present invention.

Figure 4:
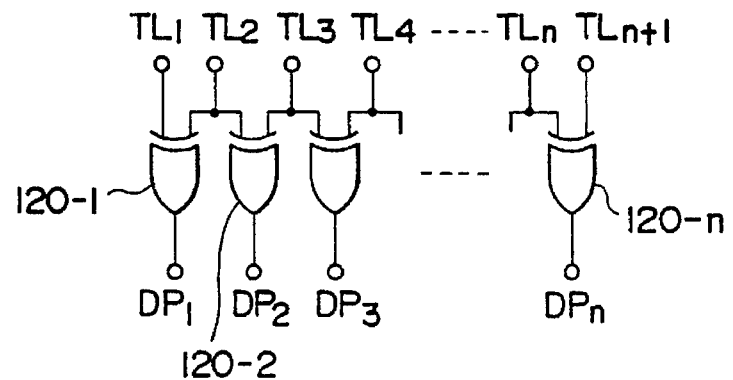
FIG. 4 is a circuit diagram depicting one example of a decoding circuit employed in the digital signal transmission circuit shown in FIG. 3.

In FIG. 3, the digital signal transmission circuit according to the second embodiment comprises a phase converting circuit 100, n+1 (where n: integer greater than or equal to 1) transmission lines $TL_1$ through $TL_{n+1}$ and phase decoding circuits 111 and 112. The phase converting circuit 100 comprises n+1 flip-flops 100-1 through 100-n+1 and a dummy pulse generating circuit 103. Each of the flip-flops 100-1 through 100-n+1 is of a positive edge T-type flip-flop and has a clock terminal CK, a reset terminal R and an output terminal Q. The clock terminals CK of the flip-flops 100-1 through 100-n respectively receive pulse signals $SP_1$ through $SP_n$. The pulse signal $SP_n$ is also used as a signal to be input to the dummy pulse generating circuit 103. The clock terminal CK of the flip-flop 100-n+1 receives a signal output from the dummy pulse generating circuit 103. In the present embodiment, the dummy pulse generating circuit 103 is used as a delay circuit, for example, which delays the signal $SP_n$ by a predetermined time interval and outputs the delayed signal therefrom. Further, the reset terminals R of the flip-flops 100-1 through 100-n+1 receive a reset signal INT. The output terminals Q of the flip-flops 100-1 through 100-n+1 are electrically connected to their corresponding transmission lines $TL_1$ through $TL_{n+1}$ connected to the phase converting circuit 100. Each of the phase decoding circuits 111 and 112 is comprised of a plurality of EXORs each activated in response to two input signals. A specific circuit configuration of each phase decoding circuit is shown in FIG. 4. The phase decoding circuit shown in FIG. 4 comprises n EXORs 120-1 through 120-n. The EXOR 120-1 receives signals transmitted through the transmission lines $TL_1$ and $TL_2$ therein. The EXOR 120-1 outputs an output signal $DP_1$ corresponding to the result of ORing of these inputs to a predetermined receiving circuit. Similarly, the EXOR 120-n receives signals transmitted through the transmission lines $TL_n$ and $TL_{n+1}$ therein. The EXOR 120-n outputs an output signal $DP_n$ corresponding to the result of ORing of these inputs to a predetermined receiving circuit. Namely, each of the phase decoding circuits 111 and 112 outputs n output signals $DP_1$ through $DP_n$ in response to the signals transmitted through the transmission lines $TL_1$ through $TL_{n+1}$.

Figure 5:
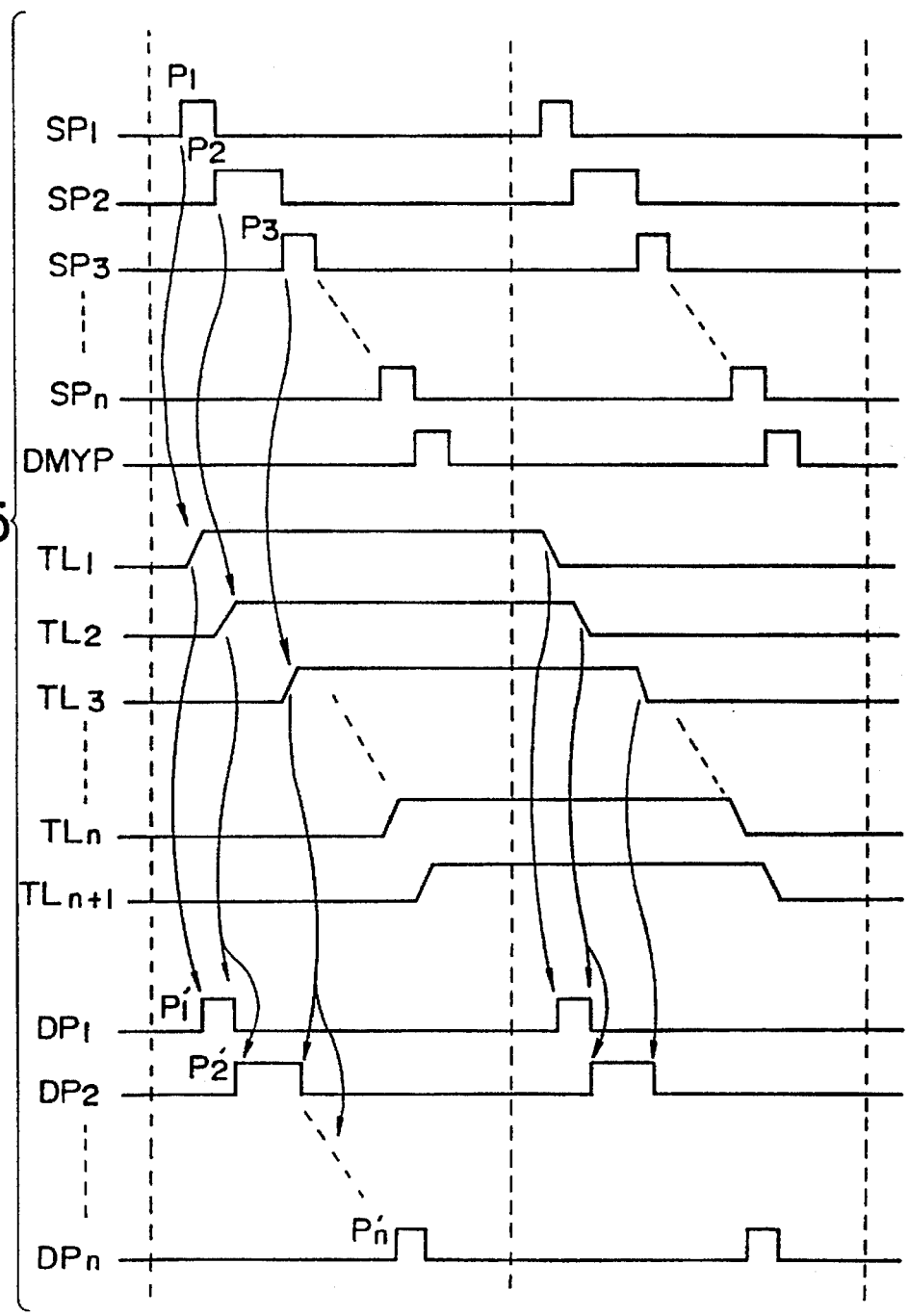
FIG. 5 is a timing chart for describing the operation of the digital signal transmission circuit shown in FIG. 3.

The operation of the digital signal transmission circuit shown in FIG. 3 will now be described with reference to the accompanying drawings. FIG. 5 is a timing chart for describing the operation of the digital signal transmission circuit shown in FIG. 3.

The reset signal INT is first input to the reset terminals of the flip-flops 100-1 through 100-n+1. Thus, since the flip-flops 100-1 through 100-n+1 are initialized, the signals whose voltage values are low in level are output from the output terminals Q of the flip-flops 100-1 through 100-n+1. The transmission lines $TL_1$ through $TL_{n+1}$ respectively transmit the signals whose voltage values are low in level, in response to the signals output from the terminals Q of the flip-flops 100-1 through 100-n+1. Thus, voltage values of output signals $DP_{11}$ through $DP_{n1}$ and $DP_{12}$ through $DP_{n2}$ produced from the phase decoding circuits 111 and 112 are all low in level. Thereafter, a first pulse signal $P_1$ is input to the clock terminal CK of the flip-flop 100-1 as the pulse signal $SP_1$. The voltage value of the signal output from the output terminal Q, of the flip-flop 100-1 changes from a low level to a high level in response to the rising edge of the pulse signal $P_1$. The voltage value of the signal transmitted through the transmission line $TL_1$ is also brought to the high level in response to such a change in the level of the signal output from the output terminal Q of the flip-flop 100-1. Since, at this time, the voltage values of the signals output from the output terminals Q of other flip-flops 100-2 through 100-n are maintained at the low level, the voltage values of the signals transmitted through the transmission lines $TL_2$ through $TL_{n+1}$ remain at the low level. This is because the flip-flops 100-2 through 100-n+1 respond to other pulse signals $SP_2$ through $SP_n$. Thus, the voltage values of the output signals $DP_{11}$ and $DP_{12}$ produced from the phase decoding circuits 111 and 112 are both brought to a high level according to a change in the voltage level of the transmission line $TL_1$. Next, a second pulse signal $P_2$ is input to the clock terminal CK of the flip-flop 100-2 as the pulse signal $SP_2$ substantially simultaneously with a fall in the pulse signal $P_1$. In response to the rising edge of the pulse signal $P_2$, the voltage value of the signal output from the output terminal Q of the flip-flop 100-2 changes from the low level to the high level. The voltage value of the signal transmitted through the transmission line $TL_2$ is also brought to the high level in response to such a change in the level of the signal output from the output terminal Q of the flip-flop 100-2. At this time, the voltage value of the signal output form the output terminal Q of the flip-flop 100-1 is maintained at the high level and the voltage values of the signals produced from the output terminals Q of the flip-flops 100-3 through 100-n are maintained at the low level. Thus, the voltage value of the signal transmitted through the transmission line $TL_1$ remains at the high level and the voltage values of the signals transmitted through the transmission lines $TL_3$ through $TL_{n+1}$ remain at the low level. The voltage values of the output signals $DP_{11}$ and $DP_{12}$ produced from the phase decoding circuits 111 and 112 are brought to the low level according to a change in the voltage level of the transmission line $TL_2$ and the voltage values of the output signals $DP_{21}$ and $DP_{22}$ are brought to the high level. As a result, each of the output signals $DP_{11}$ and $DP_{12}$ of the phase decoding circuits 111 and 112 is changed so as to generate a pulse signal $P'_1$ having a pulse width substantially identical to that of the pulse signal $P_1$. The generation of the pulse signal $P'_1$ can be done within the order of a slight delay corresponding to a response speed of each of the flip-flops 100-1 and 100-2 as compared with the generation of the pulse signal $P_1$.

Similarly, pulse signals are successively input to their Corresponding clock terminals CK of the flip-flops substantially simultaneously with falls in the preceding pulse signals as the pulse signals. Finally, an nth pulse signal $P_n$ is input to the clock terminal CK of the flip-flop 100-n substantially simultaneously with a fall in the pulse signal $P_{n-1}$. In response to the rising edge of the pulse signal $P_2$, the voltage value of the signal output from the output terminal Q of the flip-flop 100-n changes from the low level to the high level. The voltage value of the signal transmitted through the transmission line $TL_n$ is also brought to the high level in response to such a change in the level of the signal output from the output terminal Q of the flip-flop 100-n. At this time, the voltage values of the signals output from the output terminals Q of the flip-flops 100-1 through 100-$n$-1 are maintained at the high level and the voltage value of the signal produced from the output terminal Q of the flip-flop 100-$n$+1 is maintained at the low level. Thus, the voltage value of the signal transmitted through the transmission line TL$_n$ remains at the high level and the voltage values of the signals transmitted through the transmission lines TL$_1$ through TL$_n$ remain at the high level. Further, the voltage value of the signal transmitted through the line TL$_{n+1}$ is also maintained at the high level. Each of voltage values of output signals DP$_{(n-1)1}$ and DP$_{(n-1)2}$ produced from the phase decoding circuits 111 and 112 is brought to a low level according to a change in the voltage level of the transmission line TL$_n$. Each of voltage values of output signals DP$_{n1}$ and DP$_{n2}$ is brought to a high level. As a result, each of the output signals DP$_{(n-1)1}$ and DP$_{(n-1)2}$ of the phase decoding circuits 111 and 112 is changed so as to generate a pulse signal P'$_{(n-1)}$ having a pulse width substantially identical to that of the pulse signal P$_{(n-1)}$. The generation of the pulse signal P'$_{(n-1)}$ can be done within the order of a slight delay corresponding to a response speed of each of the flip-flops 100-1 through 100-$n$ as compared with the generation of the pulse signal P$_{(n-1)}$. Further, the dummy pulse generating circuit 103 delays the input pulse signal SP$_n$ by a predetermined time interval and supplies the delayed pulse signal to the clock terminal CK of the flip-flop 100-$n$+1. The time required to delay the pulse signal SP$_n$ may be set so as to correspond to a pulse width of the pulse signal SP$_n$. The voltage value of the signal output from the output terminal Q of the flip-flop 100-$n$+1 changes from the low level to the high level in response to the rising edge of the delayed pulse signal P$_n$. The voltage value of the signal transmitted through the transmission line TL$_{n+1}$ is also brought to the high level in response to such a change in the voltage level of the signal output from the output terminal Q of the flip-flop 100-$n$+1. Since, at this time, the voltage values of the signals output from the output terminals Q of other flip-flops 100-1 through 100-$n$ are maintained at the high level, the voltage values of the signals transmitted through the transmission lines TL$_1$ through TL$_n$ remain at the high level. Thus, the voltage values of the output signals DP$_{n1}$ and DP$_{n2}$ produced from the phase decoding circuits 111 and 112 are both brought to the high level according to a change in the voltage level of the transmission line TL$_{n+1}$. As a result, each of the output signals DP$_{n1}$ and DP$_{n2}$ of the phase decoding circuits 111 and 112 is changed so as to generate a pulse signal P'$_n$ having a pulse width substantially identical to that of the pulse signal P$_n$. The generation of the pulse signal P'$_n$ can be done within the order of a slight delay corresponding to the predetermined time interval set by the dummy pulse generating circuit 103 as compared with the generation of the pulse signal P$_n$.

Thereafter, new pulse signals SP$_1$ through SP$_n$ are successively input to their corresponding input terminals. Voltage values of signals output from the output terminals Q of the flip-flops 100-1 through 100-$n$+1 respectively change from a high level to a low level in response to the rising edges of the pulse signals SP$_1$ through SP$_n$ and a delayed pulse signal SP$_n$ output from the dummy pulse generating circuit 103. The voltage values of the signals transmitted through the transmission lines TL$_1$ through TL$_{n+1}$ also change from the high level to the low level in response to such changes in the voltage values of the signals output from the output terminals Q of the flip-flops 100-1 through 100-$n$+1. Signals DP$_{11}$ through DP$_{n1}$ and DP$_{12}$ through DP$_{n2}$ output from the phase decoding circuits 111 and 112 are changed so as to successively generate pulse signals having pulse widths respectively substantially identical to those of the pulse signals SP$_1$ through SP$_n$ in response to such changes in the voltage values of the signals transmitted through the transmission lines TL$_1$ through TL$_{n+1}$.

Since receiving circuits are electrically connected to the digital signal transmission circuit as described above in a manner similar to the first embodiment, the pulse signals are not directly transmitted to transmission lines each having a large load resistance and a large load capacitance. The phase converting circuit 100 generates two signals which are respectively out of phase with the pulse signals to be transmitted. The generated two signals are transmitted through the transmission lines different from each other. The phase decoding circuit 111 or 112 detects a difference in phase between the two signals and generates a pulse signal having a pulse width corresponding to the phase difference. Namely, deteriorations in the waveforms of the signals transmitted through the transmission lines, which occur due to the load resistance and the load capacitance, become the same degree. However, the difference in phase between the signals transmitted through the transmission lines is less affected by the load resistance and the load capacitance. Thus, the pulse signals having the pulse widths substantially identical to those of the pulse signals to be transmitted can be sent to their corresponding receiving circuits. Further, since the pulse signals to be transmitted are received by the phase converting circuit 100, even pulse signals whose pulse widths are short can be reliably sent to the receiving circuits without any waveform degradation. Further, the output signals of the phase decoding circuits 111 and 112 respond to the transition of the voltage value of the signal transmitted through the kth transmission line and the transistor of the voltage value of the signal transmitted through the k+1th transmission line. Thus, n pulse signals can be sent through n+1 transmission lines. Since the number of conductors or wires can be reduced as compared with the first embodiment in which the 2n transmission lines are required to transmit the n pulse signals, the area for the provision of the digital signal transmission circuit can be reduced.

Figure 6:
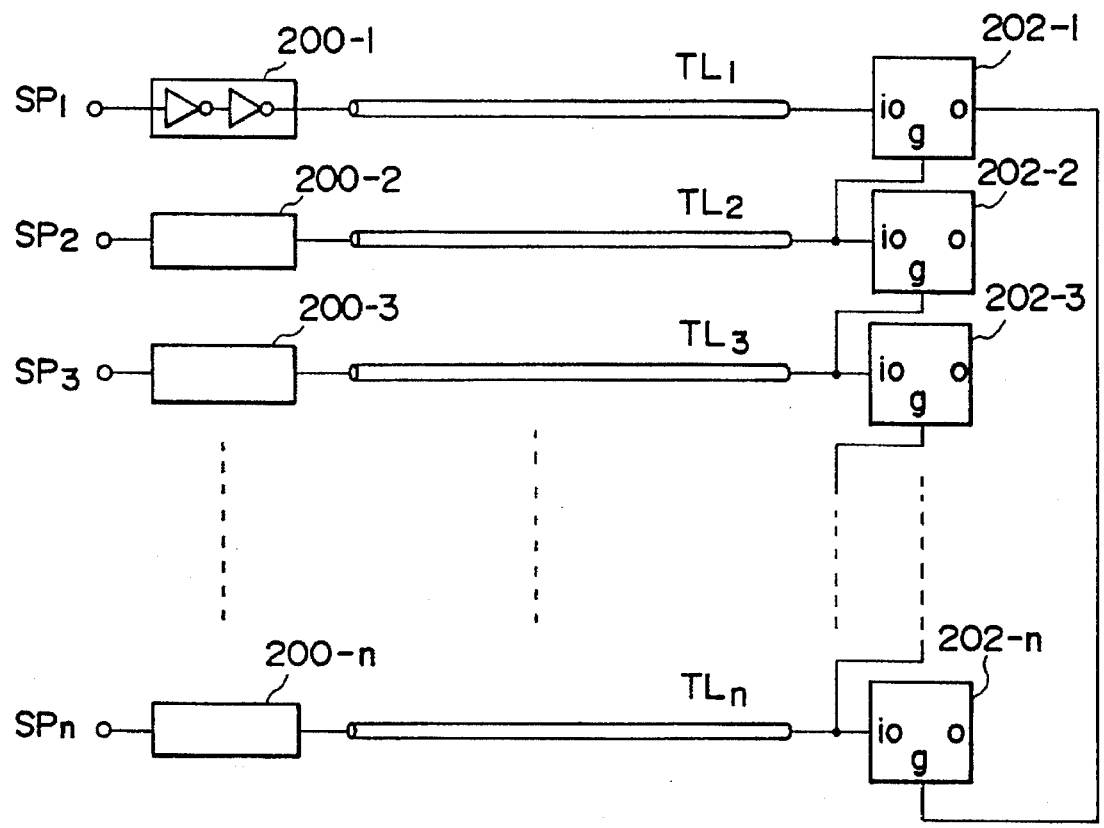
FIG. 6 is a circuit diagram illustrating a third embodiment of a digital signal transmission circuit according to the present invention.

A third embodiment will now be described with reference to the accompanying drawings. FIG. 6 is a circuit diagram showing the third embodiment of a digital signal transmission circuit of the present invention.

In FIG. 6, the digital signal transmission circuit according to the third embodiment comprises n drivers 200-1 through 200-$n$, n transmission lines TL$_1$ through TL$_n$ and n waveform shaping circuits 202-1 through 202-$n$. Each of the drivers 200-1 through 200-$n$ is comprised of two inverters series-connected to each other. The drivers 200-1 through 200-$n$ receives pulse signals SP$_1$ through SP$_n$ therein as inputs respectively. The drivers 200-1 through 200-$n$ transmit signals to the transmission lines TL$_1$ through TL$_n$ respectively. Each of the waveform shaping circuits 202-1 through 202-$n$ has an input/output terminal io, an output terminal o and a control terminal g. The waveform shaping circuits 202-1 through 202-$n$ are provided at far ends of the transmission lines TL$_1$ through TL$_n$ respectively. The input/output terminals io of the transmission lines 202-1 through 202-$n$ are respectively electrically connected to the transmission lines TL$_1$ through TL$_n$. The output terminal o of the waveform shaping circuit 202-1 is electrically connected to the control terminal g of the waveform shaping circuit 202-$n$. The output terminals o of the waveform shaping circuits 202-2 through 202-$n$ remain open. The control terminals g of the waveform shaping circuits 202-1 through 202-$n$-1 are electrically connected to their corresponding transmission lines TL$_2$ through TL$_n$.

Figure 7:
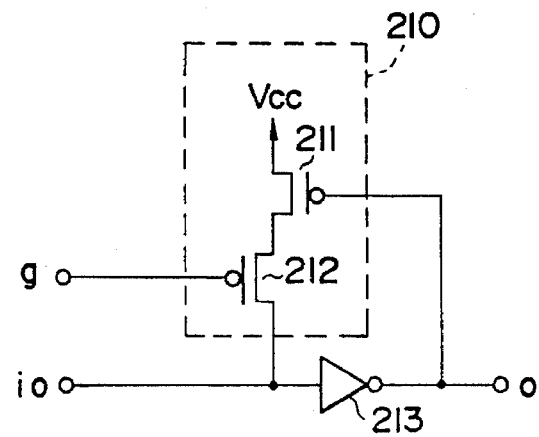
FIG. 7 is a circuit diagram showing one example of a waveform shaping circuit employed in the digital signal transmission circuit shown in FIG. 6.

Circuit configurations of the waveform shaping circuits 202-1 through 202-n will now be described with reference to FIG. 7. Each of the waveform shaping circuits 202-1 through 202-n comprises a feedback circuit Z10 comprised of two P-channel MOS transistors (hereinafter called "PMOSs") 211 and 212, and an inverter 213. A source electrode of the PMOS211 is supplied with a power source voltage Vcc and a drain electrode thereof is electrically connected to a source electrode of the PMOS212. A gate electrode of the PMOS211 is electrically connected to the output terminal o of the waveform shaping circuit. A drain electrode of the PMOS212 is electrically connected to the input/output terminal io of the waveform shaping circuit. A gate electrode of the PMOS212 is electrically connected to the control terminal g of the waveform shaping circuit. The drain electrode of the PMOS212 is electrically connected to the input of the inverter 213, whereas the gate electrode of the PMOS211 is electrically connected to the output of the inverter 213. Thus, when a signal whose voltage value is of a low level is input to the control signal g, the waveform shaping circuit is brought into an enable state. Further, when a signal whose voltage value is of a high level is input to the input/output terminal io, the power source voltage Vcc is supplied to the input/output terminal io.

Figure 8:
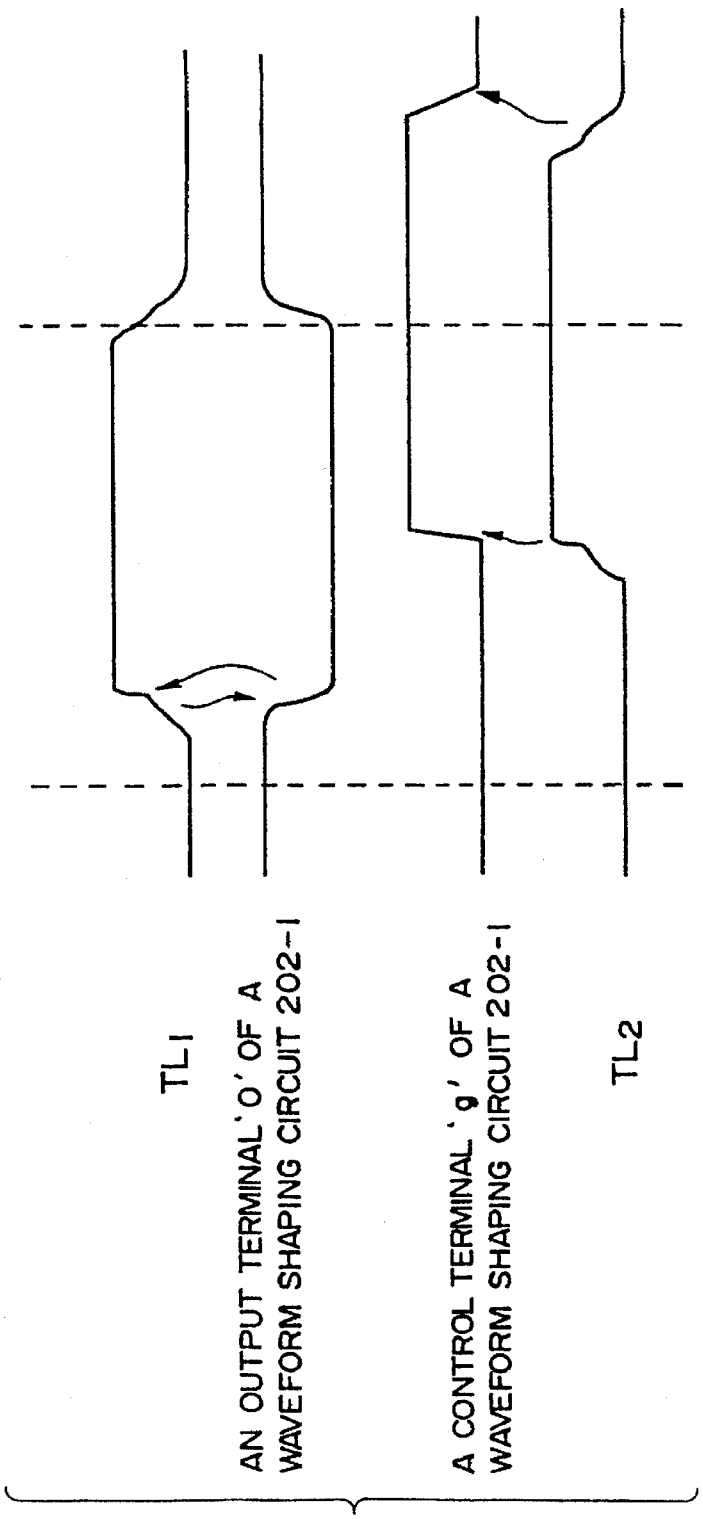
FIG. 8 is a timing chart for describing the operation of the digital signal transmission circuit shown in FIG. 6.

The operation of the digital signal transmission circuit shown in FIG. 6 will now be described with reference to the accompanying drawings. FIG. 8 is a timing chart for describing the operation of the digital signal transmission circuit shown in FIG. 6.

Signals whose voltage values are low in level are first supplied to the transmission lines $TL_1$ through $TL_n$ through the drivers 200-1 through 200-n as an initial state. Further, the voltage values of the signals supplied to the transmission lines $TL_1$ through $TL_n$ are respectively supplied to the input/output terminals io of the waveform shaping circuits 202-1 through 202-n. Furthermore, the voltage values of the signals supplied to the transmission lines $TL_2$ through $TL_n$ are respectively supplied to the control terminals g of the waveform shaping circuits 202-1 through 202-n-1. Therefore, each of the waveform shaping circuits 202-1 through 202-n-1 is brought into an enable state. Now, the value of a voltage at the output terminal o of the waveform shaping circuit 202-1 is brought to a high level. Therefore, the waveform shaping circuit 202-n is brought into a deactivating state. Now, consider that a pulse signal $SP_1$ is thereafter input to the driver 200-1, for example. The pulse signal $SP_1$ is sent to the transmission line $TL_1$. A voltage value of a high level is supplied to the input/output terminal io of the waveform shaping circuit 202-1 in response to the rising edge of the pulse signal $SP_1$. Therefore, the waveform shaping circuit 202-1 is activated so as to apply the power source voltage Vcc to the transmission line $TL_1$ through the input/output terminal io. Accordingly, the rising of the voltage value at the transmission line $TL_1$ is accelerated. Since, at this time, the voltage value at the output terminal o of the waveform shaping circuit 202-1 is low in level, the waveform shaping circuit 202-n is brought into the enable state. Let's next consider that a pulse signal $SP_2$ is input to the driver 200-2. The pulse signal $SP_2$ is transmitted to the transmission line $TL_2$. A voltage value of a high level is supplied to the input/output terminal io of the waveform shaping circuit 202-2 in response to the rising edge of the pulse signal $SP_2$. Therefore, the waveform shaping circuit 202-2 is activated so as to apply the power source voltage Vcc to the transmission line $TL_2$ through the input/output terminal io. Accordingly, the rising of the voltage value at the transmission line $TL_2$ is accelerated. At this time, the voltage value at the transmission line $TL_2$ is supplied to the control terminal g of the waveform shaping circuit 202-1. Thus, the waveform shaping circuit 202-1 is brought into a non-operating state. Thereafter, the waveform shaping circuit 202-1 is brought into the non-operating state when the pulse signal $SP_1$ falls. Thus, since no current flows in the waveform shaping circuit 202-1, it does not interfere with the falling of the pulse signal supplied to the transmission line $TL_1$. As a result, the rising of the pulse signal $SP_1$ sent to the transmission line $TL_1$ is accelerated. Further, since the falling of the pulse signal is not affected by the waveform shaping circuit, the pulse signal can be transmitted at a high speed.

A fourth embodiment will now be described with reference to the accompanying drawings.

Figure 9:
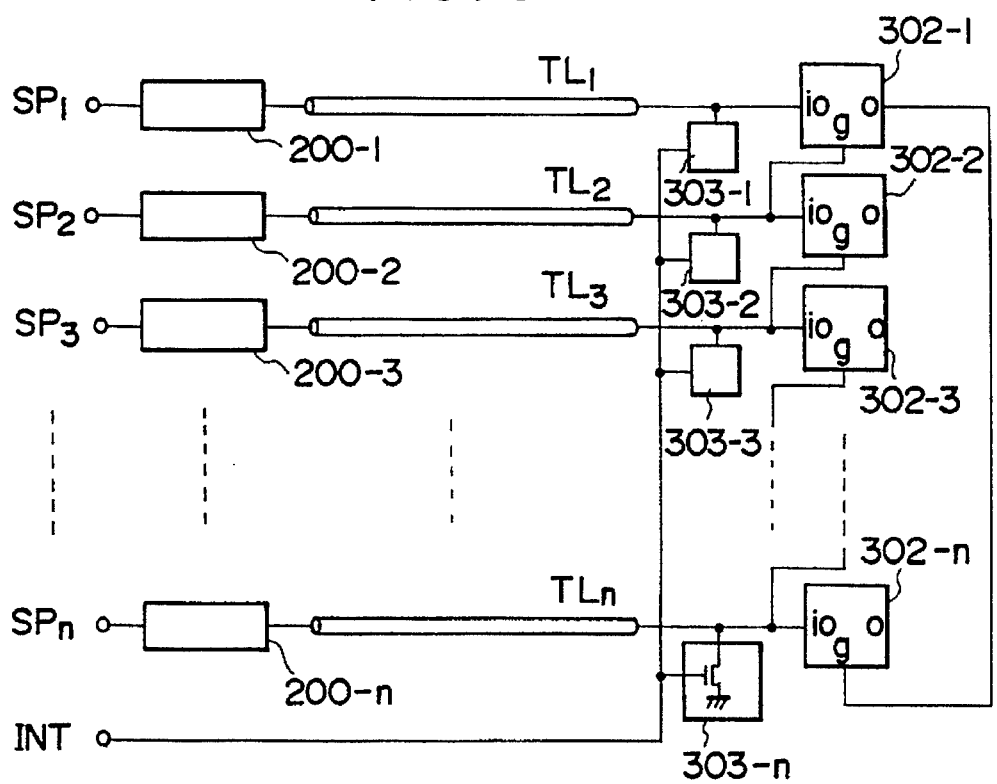
FIG. 9 is a circuit diagram illustrating a fourth embodiment of a digital signal transmission circuit according to the present invention.
Figure 10:
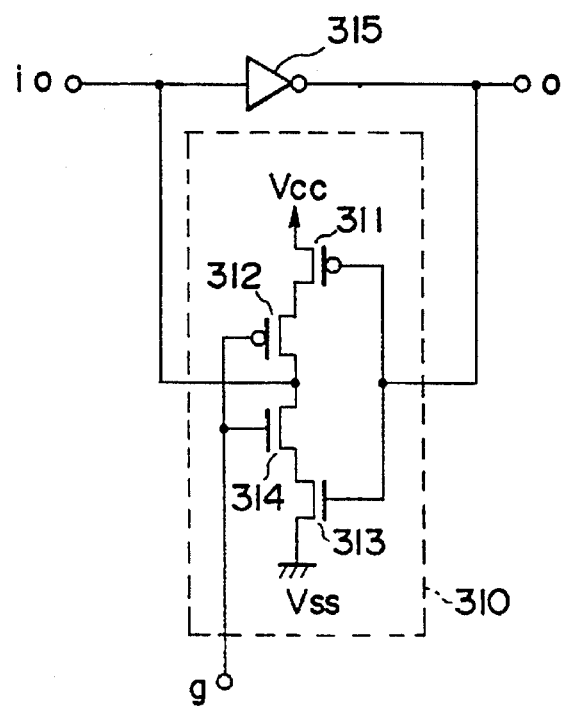
FIG. 10 is a circuit diagram showing a first example of a waveform shaping circuit employed in the digital signal transmission circuit shown in FIG. 9.

FIG. 9 is a circuit diagram showing the fourth embodiment of a digital signal transmission circuit according to the present invention. The fourth embodiment relates to an improvement in the third embodiment shown in FIG. 6. A difference in structure between the fourth embodiment and the third embodiment will now be described below. In the digital signal transmission circuit according to the fourth embodiment, n drivers 200-1 through 200-n and n transmission lines $TL_1$ through $TL_n$ are provided in a manner similar to the third embodiment. Further, the digital signal transmission circuit according to the fourth embodiment has n waveform shaping circuits 302-1 through 302-n in a manner similar to the third embodiment but is different in circuit configuration from that according to the third embodiment. Circuit configurations of the waveform shaping circuits 302-1 through 302-n employed in the fourth embodiment will be described with reference to FIG. 10. Each of the waveform shaping circuits 302-1 through 302-n comprises a feedback circuit 310 comprised of two ROSs 311 and 312 and two N-channel MOS transistors (hereinafter called "NMOSs") 313 and 314, and an inverter 315. A source electrode of the PMOS311 is supplied with a power source voltage Vcc and a drain electrode thereof is electrically connected to a source electrode of the PMOS312. A gate electrode of the PMOS311 is electrically connected to an output terminal o of the waveform shaping circuit. A drain electrode of the PMOS312 is electrically connected to an input/output terminal io of the waveform shaping circuit. A gate electrode of the PMOS312 is electrically connected to a control terminal g of the waveform shaping circuit. A source electrode of the NMOS313 is supplied with a ground voltage Vss. A drain electrode of the NMOS313 is electrically connected to a source electrode of the NMOS314. A gate electrode of the NMOS313 is electrically connected to the output terminal o of the waveform shaping circuit. A drain electrode of the NMOS314 is electrically connected to the input/output terminal io of the waveform shaping circuit. A gate electrode of the NMOS314 is electrically connected to the control terminal g of the waveform shaping circuit. The drain electrode of the PMOS312 is electrically connected to the input of the inverter 315, whereas the gate electrode of the PMOS311 is electrically connected to the output of the inverter 315. Thus, when a signal whose voltage value is of a low level is input to the control signal g of the waveform shaping circuit and a signal whose voltage value is high in level is input to the input/output terminal io thereof, the waveform shaping circuit supplies the power source voltage Vcc to the input/output terminal io. Further, when a signal whose voltage value is of a high level is input to the control terminal g of the waveform shaping circuit and a signal whose voltage value is low in level is input to the input/output terminal io thereof, the waveform shaping circuit supplies the voltage Vss to the input/output terminal io.

Further, initialization circuits 303-1 through 303-n are respectively provided between the transmission lines TL$_1$ through TL$_n$ and the waveform shaping circuits 302-1 through 302-n shown in FIG. 9. Each of the initialization circuits 303-1 through 303-n is comprised of, for example, an NMOS activated in response to a reset signal INT input from an input terminal 301. The NMOS is activated so as to supply the ground voltage Vss to each transmission line.

Figure 11:
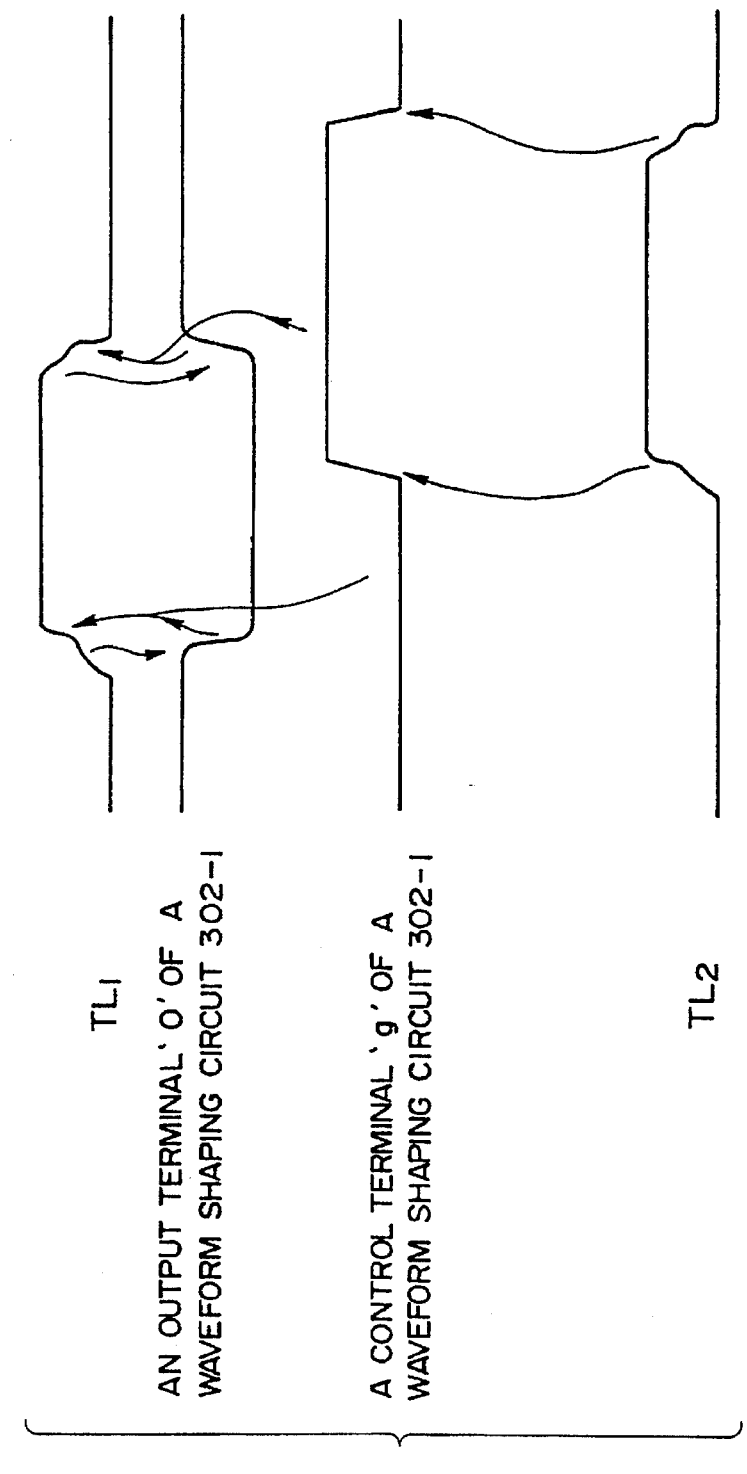
FIG. 11 is a timing chart for describing the operation of the digital signal transmission circuit.

The operation of the digital signal transmission circuit shown in FIG. 9 will now be described with reference to the accompanying drawings. FIG. 11 is a timing chart for describing the operation of the digital signal transmission circuit of FIG. 9.

Values of voltages applied to the transmission lines TL$_1$ through TL$_n$ are first brought to a low level by the initialization 303-1 through 303-n each activated in response to the reset signal INT, as an initial state. Further, the values of the voltages supplied to the transmission lines TL$_1$ through TL$_n$ are respectively supplied to the input/output terminals io of the waveform shaping circuits 302-1 through 302-n. Furthermore, the voltage values at the transmission lines TL$_2$ through TL$_n$ are respectively supplied to the control terminals g of the waveform shaping circuits 302-1 through 302-n–1. Therefore, each of the waveform shaping circuits 302-1 through 302-n–1 does not supply the voltage to each of the transmission lines TL$_1$ through TL$_{n-1}$. Now, the value of a voltage at the output terminal o of the waveform shaping circuit 302-1 is brought to a high level. Therefore, the waveform shaping circuit 302-n supplies the voltage Vss to the transmission line TL$_n$. Now, consider that a pulse signal SP$_1$ is thereafter input to the driver 200-1, for example. The pulse signal SP$_1$ is sent to the transmission line TL$_1$. A voltage value of a high level is supplied to the input/output terminal io of the waveform shaping circuit 302-1 in response to the rising edge of the pulse signal SP$_1$. Therefore, the waveform shaping circuit 302-1 supplies the power source voltage Vcc to the transmission line TL$_1$ through the input/output terminal io. Accordingly, the rising of the voltage value at the transmission line TL$_1$ is accelerated. Since, at this time, the voltage value at the output terminal o of the waveform shaping circuit 302-1 is low in level, the waveform shaping circuit 302-n is brought into a state in which no voltage is being supplied to the transmission line TL$_n$. Let's next consider that a pulse signal SP$_2$ is input to the driver 200-2. The pulse signal SP$_2$ is transmitted to the transmission line TL$_2$. A voltage value of a high level is supplied to the input/output terminal io of the waveform shaping circuit 302-2 in response to the rising edge of the pulse signal SP$_2$. Therefore, the waveform shaping circuit 302-2 is activated so as to apply the power source voltage Vcc to the transmission line TL$_2$ through the input/output terminal io. Accordingly, the rising of the voltage value at the transmission line TL$_2$ is accelerated. At this time, the voltage value at the transmission line TL$_2$ is supplied to the control terminal g of the waveform shaping circuit 302-1. Thus, the waveform shaping circuit 302-1 stops the supply of the power source voltage Vcc to the transmission line TL$_1$. Thereafter, a voltage value of a low level is supplied to the input/output terminal io of the waveform shaping circuit 302-1 in response to the falling edge of the pulse signal SP$_1$. Therefore, the waveform shaping circuit 302-1 supplies the voltage Vss to the transmission line TL$_1$ through the input/output terminal io. As a result, the falling of the voltage value at the transmission line TL$_1$ is accelerated. Since, at this time, the value of the voltage at the output terminal o of the waveform shaping circuit 302-1 becomes a high level, the waveform shaping circuit 302-n supplies the voltage Vss to the transmission line TL$_n$ again. Operations similar to the above operation are hereafter executed each time pulse signals SP$_3$ through SP$_n$ are successively input to their corresponding transmission lines TL$_3$ through TL$_n$.

Thus, the rising and falling of each pulse signal are both accelerated in the fourth embodiment. The digital signal transmission circuit according to the fourth embodiment can therefore transmit the pulse signals at a high speed as compared with that according to the third embodiment.

The circuit configurations of the waveform shaping circuits employed in the fourth embodiment are not necessarily limited to the circuit configurations shown in FIG. 9. It is needless to say that other circuit configurations may be used. Other circuit configurations of the waveform shaping circuits will now be shown in FIGS. 12 through 14.

Figure 12:
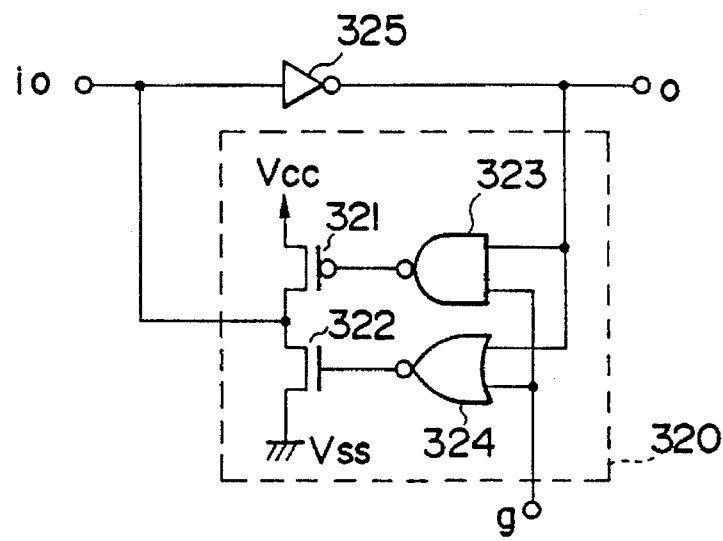
FIG. 12 is a circuit diagram showing a second example of the waveform shaping circuit employed in the digital signal transmission circuit shown in FIG. 9.

FIG. 12 illustrates a second example of the waveform shaping circuit. The waveform shaping circuit comprises a PMOS321, an NMO322, a two-input NAND circuit 323, a two-input NOR circuit 324 and an inverter 325. A source electrode of the PMOS321 is supplied with a power source voltage Vcc and a drain electrode thereof is electrically connected to a drain electrode of the NMOS322 and an input/output terminal io. A source electrode of the NMOS322 is supplied with a ground voltage Vss. The NAND circuit 323 receives therein signals input to an output terminal o and a control terminal g. A signal output from the NAND circuit 323 is supplied to a gate electrode of the PMOS321. Similarly, the NOR circuit 324 receives therein the signals input to the output terminal o and the control terminal g. A signal output from the NOR circuit 324 is supplied to a gate electrode of the NMOS322. The PMOS321, the NMOS322, the NAND circuit 323 and the NOR circuit 324 form a feedback circuit 320. The input of the inverter 325 is electrically connected to the input/output terminal io and the output thereof is electrically connected to the output terminal o.

The waveform shaping circuit is activated in a manner substantially similar to each of the waveform shaping circuits shown in FIG. 9. Namely, when a signal whose voltage value is low in level is input to the control terminal g and a signal whose voltage value is high in level is input to the input/output terminal io, the waveform shaping circuit supplies the source power voltage Vcc to the input/output terminal io. Further, when a signal whose voltage value is high in level is input to the control terminal g or a signal whose voltage value is low in level is input to the input/output terminal io, the waveform shaping circuit supplies the voltage Vss to the input/output terminal io. In the configuration of the present waveform shaping circuit, only one MOS transistor is electrically connected between the power source voltage Vcc or the ground voltage Vss and the input/output terminal io. Thus, the waveform shaping circuit can bring about the same advantageous effect as that obtained by the waveform shaping circuit shown in FIG. 10. Further, the waveform shaping circuit is increased in current drive capacity as compared with the waveform shaping circuit shown in FIG. 10.

Figure 13:
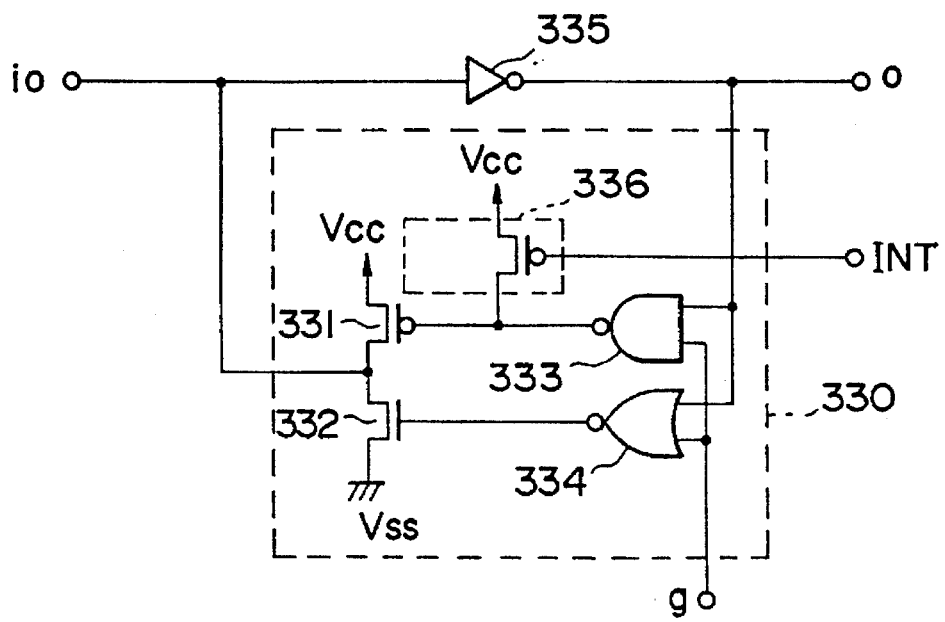
FIG. 13 is a circuit diagram depicting a third example of the waveform shaping circuit employed in the digital signal transmission circuit shown in FIG. 9.

FIG. 13 is a view for describing a third example of the waveform shaping circuit. The waveform shaping circuit is substantially identical in structure to the waveform shaping circuit shown in FIG. 12. Namely, a PMOS331, an NMOS332, a NAND circuit 333 and a NOR circuit 334 shown in FIG. 13 are provided so as to correspond to the PMOS321, the NMOS322, the NAND circuit 323 and the NOR circuit 324 shown in FIG. 12 respectively. However, the waveform shaping circuit shown in FIG. 13 is provided with an initialization circuit 336. The initialization circuit 336 is activated in response to a reset signal INT and is comprised of a PMOS for supplying a power source voltage Vcc to a gate electrode of the PMOS331. When the present waveform shaping circuit is used, the initialization circuits 303-1 through 303-n shown in FIG. 9 become unnecessary. Thus, the initialization circuit 336 deactivates the PMOS331 in response to the reset signal INT and supplies a ground voltage Vss to a corresponding transmission line through the input/output terminal io. Other operations of the waveform shaping circuit are similar to those of the waveform shaping circuit shown in FIG. 12. When the initialization circuit 336 initializes a transmission line, the initialization circuit 336 does not need to directly drive a transmission line having a large load resistance and a large load capacitance. Namely, since the initialization circuit may drive only a part of the waveform shaping circuit, the initialization circuit can provide quick initial setup.

Figure 14:
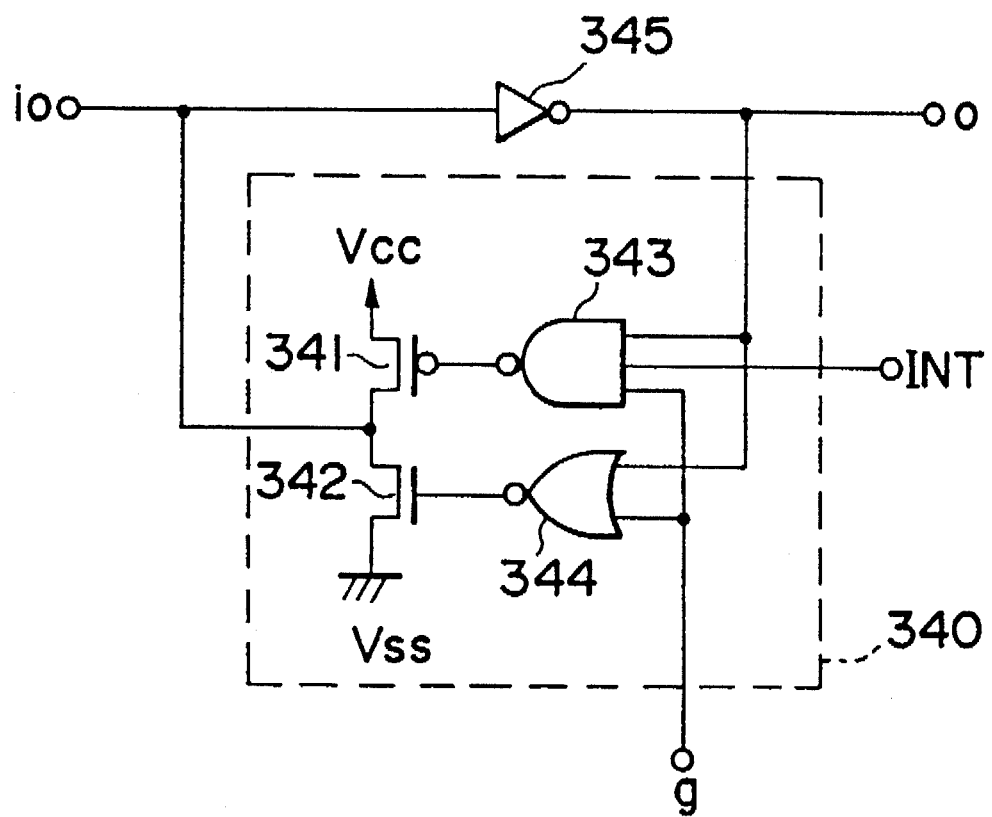
FIG. 14 is a circuit diagram showing a fourth example of the waveform shaping circuit employed in the digital signal transmission circuit shown in FIG. 9.

FIG. 14 is a view for describing a fourth example of the waveform shaping circuit. The waveform shaping circuit is substantially identical in structure to the waveform shaping circuit shown in FIG. 12. Namely, a PMOS341, an NMOS342, a NAND circuit 343 and a NOR circuit 344 shown in FIG. 14 are provided so as to correspond to the PMOS321, the NMOS322, the NAND circuit 323 and the NOR circuit 324 shown in FIG. 12 respectively. However, the NAND circuit 343 shown in FIG. 14 is of a three-input NAND circuit. In other words, a reset signal INT is applied to the NAND circuit 343 as an input. When the present waveform shaping circuit is used, the initialization circuits 303-1 through 303-n shown in FIG. 9 become unnecessary. Thus, the initialization circuit 343 deactivates the PNIOS341 in response to the resent signal INT and supplies a ground voltage Vss to a corresponding transmission line through an input/output terminal io. Other operations of the waveform shaping circuit are similar to those of the waveform shaping circuit shown in FIG. 12. When the initialization circuit initializes a transmission line, the initialization circuit does not need to directly drive a transmission line having a large load resistance and a large load capacitance. Namely, since the initialization circuit may drive only a part of the waveform shaping circuit, the initialization circuit can provide quick initial setup. Since a through current can be prevented from flowing at the time of the initial setup, current consumption can be reduced.

Figure 15:
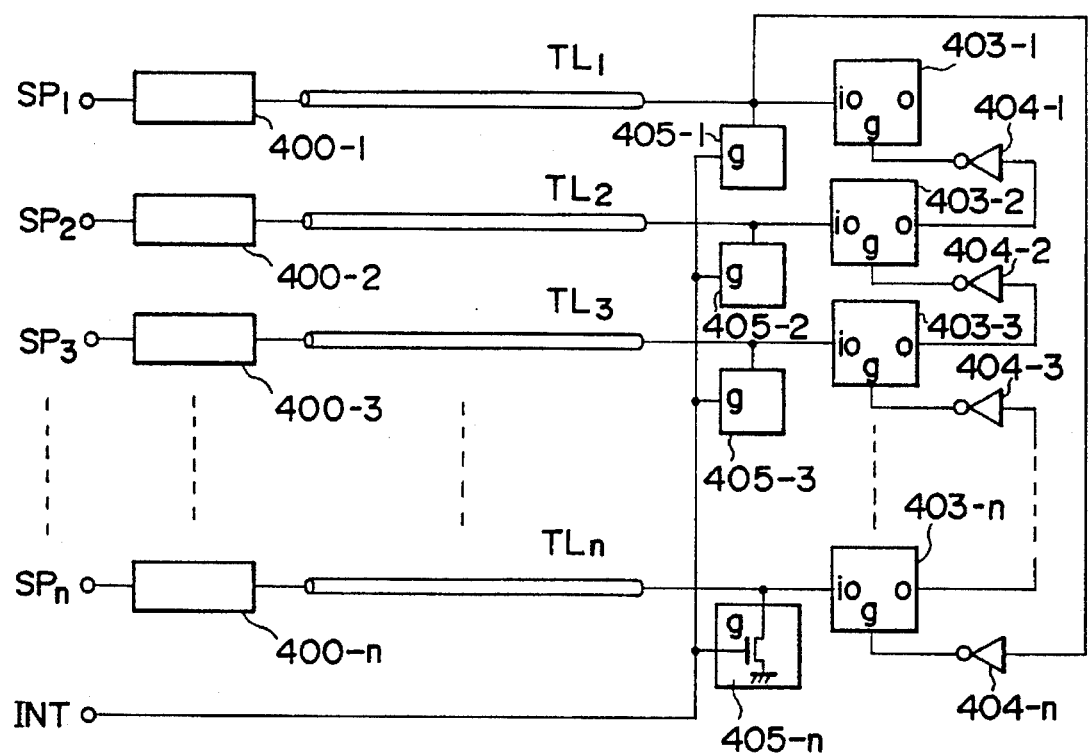
FIG. 15 is a circuit diagram illustrating a fifth embodiment of a digital signal transmission circuit according to the present invention.

A fifth embodiment will now be described with reference to the accompanying drawings. FIG. 15 is a circuit diagram showing the fifth embodiment of a digital signal transmission circuit according to the present invention.

In FIG. 15, the digital signal transmission circuit according to the fifth embodiment comprises n drivers 400-1 through 400-n, n transmission lines $TL_1$ through $TL_n$, n waveform shaping circuits 403-1 through 403-n, n inverters 404-1 through 404-n and n initialization circuits 405-1 through 405-n.

The fifth embodiment relates to an improvement in the fourth embodiment. That is, in the fourth embodiment shown in FIG. 9, the output terminal o of the waveform shaping circuit 302-1 is electrically connected to the control terminal g of the waveform shaping circuit 302-n. The output terminals o of the waveform shaping circuits 302-2 through 302-n remain open. The control terminals g of the waveform shaping circuits 302-1 through 302-n–1 are electrically connected to their corresponding transmission lines $TL_1$ through $TL_n$. On the other hand, an output terminal o of the waveform shaping circuit 403-1 remains open in the fifth embodiment. Output terminals o of the waveform shaping circuits 403-2 through 403-n are electrically connected to their corresponding control terminals g of the waveform shaping circuits 403-1 through 403-n–1 through the inverters 404-1 though 404-n–1. The transmission line $TL_1$ is electrically connected to a control terminal g of the waveform shaping circuit 403-n through the inverter 404-n. The fifth embodiment is identical in other structure to the fourth embodiment. The values of voltages applied to the output and control terminals o and g of the waveform shaping circuits employed in the fifth embodiment are identical to those of the waveform shaping circuits employed in the third embodiment. Thus, since the fifth embodiment has the same advantageous effects as those obtained in the fourth embodiment and feedback circuits provided within the waveform shaping circuits are not directly connected to their corresponding transmission lines, the load on each transmission line does not increase. It is therefore possible to increase the current-driven power of MOS transistors which form each of the feedback circuits and transmit pulse signals at a high speed.

Figure 16:
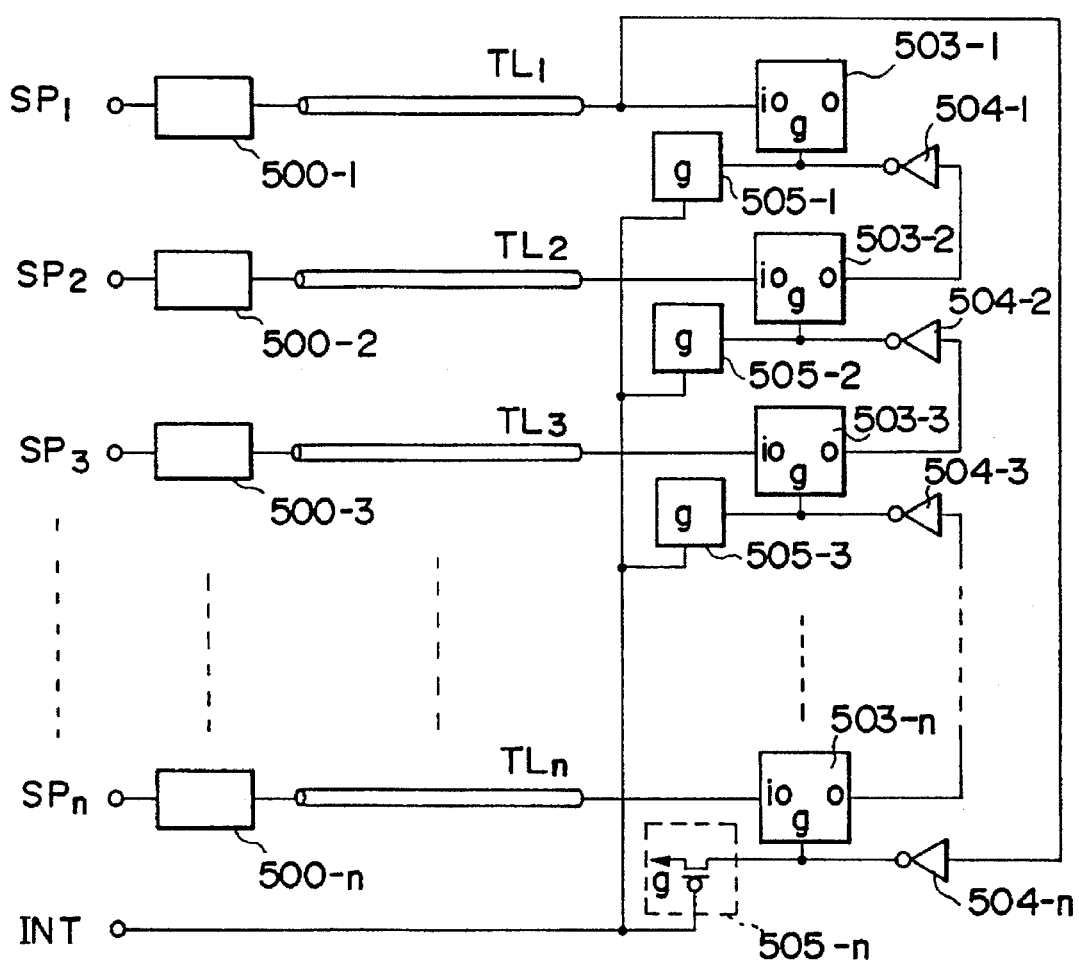
FIG. 16 is a circuit diagram showing a sixth embodiment of a digital signal transmission circuit according to the present invention.

A sixth embodiment will now be described with reference to the accompanying drawings. FIG. 16 is a circuit diagram showing the sixth embodiment of a digital signal transmission circuit according to the present invention.

In FIG. 16, the digital signal transmission circuit according to the sixth embodiment comprises n drivers 500-1 through 500-n, n transmission lines $TL_1$ through $TL_n$, n waveform shaping circuits 503-1 through 503-n, n inverters 504-1 through 504-n and n initialization circuits 505-1 through 505-n.

The sixth embodiment relates to an improvement in the fifth embodiment. Namely, the initialization circuits 405-1 through 405-n employed in the fifth embodiment shown in FIG. 15 are respectively activated in response to a reset signal INT. Further, each of the initialization circuits 405-1 through 405-n comprises an NMOS for supplying a ground voltage Vss to each of the transmission lines $TL_1$ through $TL_n$. On the other hand, each of the initialization circuits 505-1 through 505-n employed in the sixth embodiment is activated in response to a reset signal INT and comprises a PMOS for supplying a power source voltage Vcc to a control terminal g of each of the waveform shaping circuits 503-1 through 503-n. The sixth embodiment is identical in other structure to the fifth embodiment. In the sixth embodiment, the initialization circuits 505-1 through 505-n respectively drive feedback circuits provided within the waveform shaping circuits 503-1 through 503-n upon initializing the transmission lines. When the feedback circuits are driven, the waveform shaping circuits 503-1 through 503-n supply the ground voltage Vss to the transmission lines $TL_1$ through $TL_n$. Thus, the sixth embodiment can bring about the same advantageous effect as that obtained in the fifth embodiment. Further, the initialization circuits do not need to directly drive the transmission lines each having a large load resistance and a large load capacitance when the transmission lines are initialized. Namely, since the initialization circuits may simply drive NMOSs of the waveform shaping circuits respectively, the transmission lines can be rapidly initialized.

Figure 17:
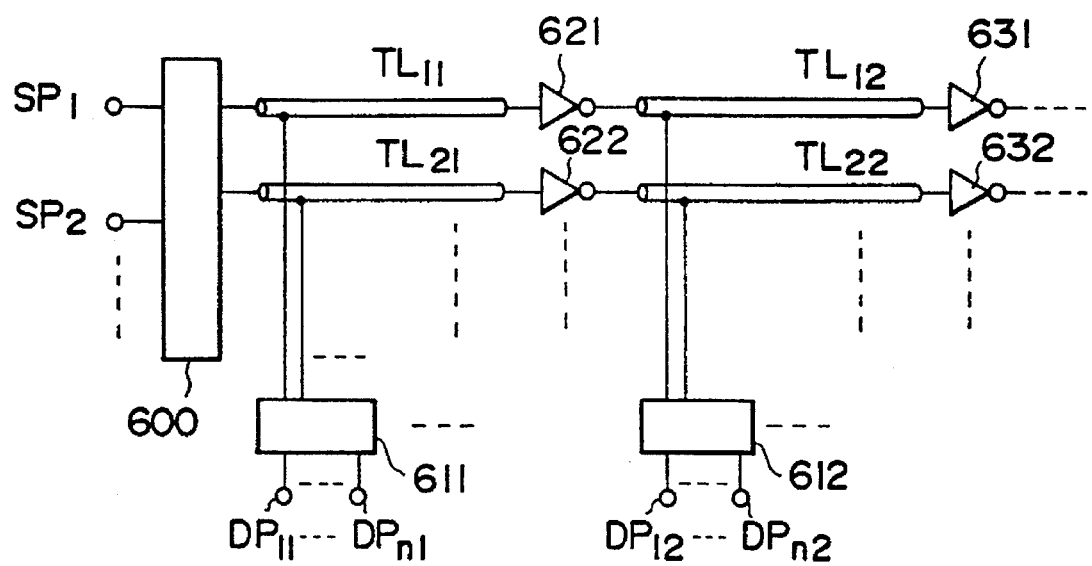
FIG. 17 is a circuit diagram depicting a seventh embodiment of a digital signal transmission circuit according to the present invention.

A seventh embodiment will now be described below with reference to the accompanying drawings. FIG. 17 is a circuit diagram showing the seventh embodiment of a digital signal transmission circuit according to the present invention.

The seventh embodiment relates to an improvement in the second embodiment shown in FIG. 3. That is, the digital signal transmission circuit shown in FIG. 17 has a phase converting circuit 600 and phase decoding circuits 611 ad 612, which are similar to those employed in the second embodiment. However, a single transmission line is continuously used in the second embodiment, whereas a single transmission line is divided into a plurality of segments in the seventh embodiment. Namely, the transmission line $TL_1$ is provided as a single unit in the second embodiment shown in FIG. 3, whereas transmission lines $TL_{11}$ and $TL_{12}$ are connected to each other with an inverter 621 interposed therebetween in the seventh embodiment as an alternative to the transmission line $TL_1$ employed in the second embodiment. Similarly, transmission lines $TL_{21}$ and $TL_{22}$ are connected to each other with an inverter 622 interposed therebetween in the seventh embodiment shown in FIG. 17 as an alternative to the single transmission line $TL_2$ employed in the second embodiment shown in FIG. 3. Further, the phase decoding circuit 611 is electrically connected to the transmission line $TL_{11}$ and $TL_{21}$ and the phase decoding circuit 612 is electrically connected to the transmission lines $TL_{12}$ and $TL_{22}$. In other words, a single phase decoding circuit is electrically connected to respective ones of the divided transmission lines. Thus, the digital signal transmission circuit according to the seventh embodiment is activated in a manner similar to that according to the second embodiment.

Figure 18:
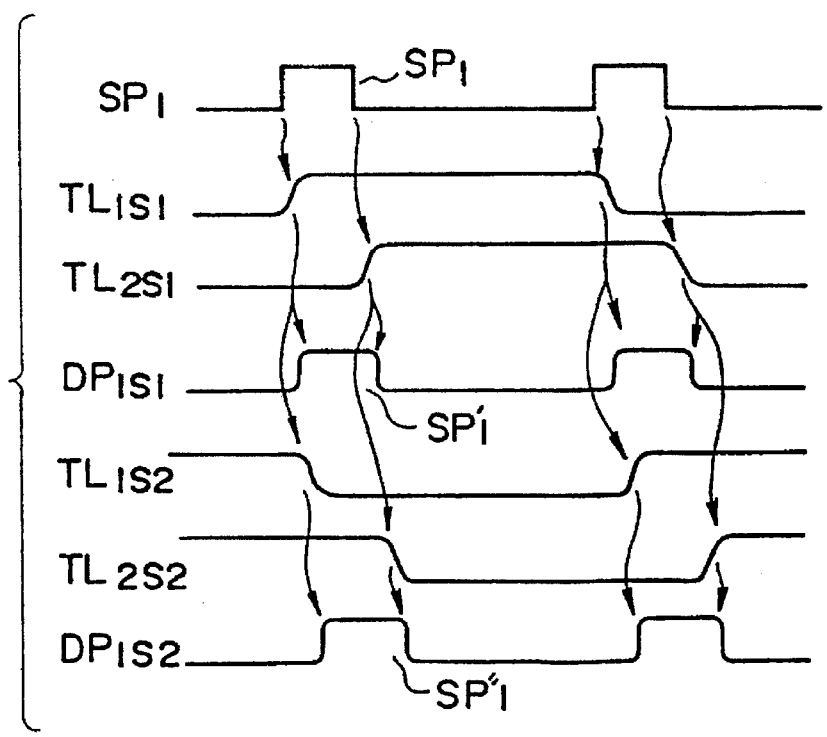
FIG. 18 is a timing chart for describing the operation of the digital signal transmission circuit shown in FIG. 17.

The operation of the digital signal transmission circuit shown in FIG. 17 will now be described below with reference to the accompanying drawings. FIG. 18 is a timing chart for describing the operation of the digital signal transmission circuit shown in FIG. 17.

When the digital signal transmission circuit is in an initial state, the values of voltages applied to input terminals are low in level. Therefore, the transmission lines $TL_{11}$ and $TL_{21}$ transmit signals whose voltage values are low in level to the corresponding phase decoding circuit. Thus, voltage values of signals $DP_{11}$ through $DP_{n1}$ and $DP_{12}$ through $DP_{n2}$ respectively output from the phase decoding circuits 611 and 612 are all low in level. Thereafter, a first pulse signal $SP_1$ is input to the phase converting circuit 600. Since the phase converting circuit 600 is identical in operation to the phase converting circuit 100 shown in FIG. 3, the transmission line $TL_{11}$ sends a signal whose voltage value is high in level in response to the rising edge of the pulse signal $SP_1$, whereas the transmission line $TL_{12}$ transmits a signal whose voltage value is low in level. At this time, the voltage value of the signal transmitted through the transmission line $TL_{12}$ is maintained at a low level and the voltage value of the signal transmitted through the transmission line $TL_{22}$ is maintained at a high level. Each of the output signals $DP_{11}$ and $DP_{12}$ of the phase decoding circuits 611 and 612 is brought to a high level according to a change in the voltage applied to each of the transmission lines $TL_{11}$ and $TL_{12}$. Thereafter, a second pulse signal $SP_2$ is input to the phase converting circuit 600 through the input terminal 601-2 substantially simultaneously with the falling edge of the pulse signal $SP_1$. In response to the pulse signal $SP_2$, the transmission line $TL_{21}$ transmits a signal whose voltage value is high in level to the corresponding phase decoding circuit, whereas the transmission line $TL_{22}$ sends a signal whose voltage value is low in level to the corresponding phase decoding circuit. At this time, the voltage value of the signal transmitted through the transmission line $TL_{21}$ is maintained at a high level and the voltage value of the signal transmitted through the transmission line $TL_{22}$ is maintained at a low level. Each of the output signals $DP_{11}$ and $DP_{12}$ of the phase decoding circuits 611 and 612 is brought to a low level according to a change in the voltage applied to each of the transmission lines $TL_{21}$ and $TL_{22}$. Thus, the output signals $DP_{11}$ and $DP_{12}$ of the phase decoding circuits 611 and 612 respectively generate pulse signals $SP'_1$ and $SP''_1$ each having a pulse width substantially identical to that of the pulse signal $SP_1$. The generation of each of the pulse signals $SP'_1$ and $SP''_1$ can be done within the order of a slight delay corresponding to a response speed of the phase converting circuit 6 as compared with the generation of the pulse signal $SP_1$. When the pulse signals $SP_1$ and $SP_2$ are thereafter input again, the same operation as that referred to above is performed.

Thus, the seventh embodiment can bring about the same advantageous effect as that obtained in the second embodiment. Further, the seventh embodiment is constructed such that the transmission line is divided into the plurality of segments and the inverters are respectively interposed between the adjacent divided segments or transmission lines so as to shape the waveforms of the applied voltages. Therefore, each of the load resistance and capacitance of the single transmission line can be reduced to a fraction of the load resistance and capacitance of each of the divided transmission lines. It is therefore possible to transmit the pulse signals at a high speed. Incidentally, a transmission delay time of each transmission line is represented as follows. Now, consider that a transmission delay time of a non-divided transmission line is taken as $t_0$, the number of divided transmission lines is taken as m and a transmission delay time of one inverter interposed between the divided adjacent transmission lines is taken as $t_{DINV}$, the transmission delay time t of each of the transmission lines employed in the seventh embodiment is represented as follows:

$$t=(¼)^m t_0 + 2(m-1)t_{DINV}$$

Figure 19:
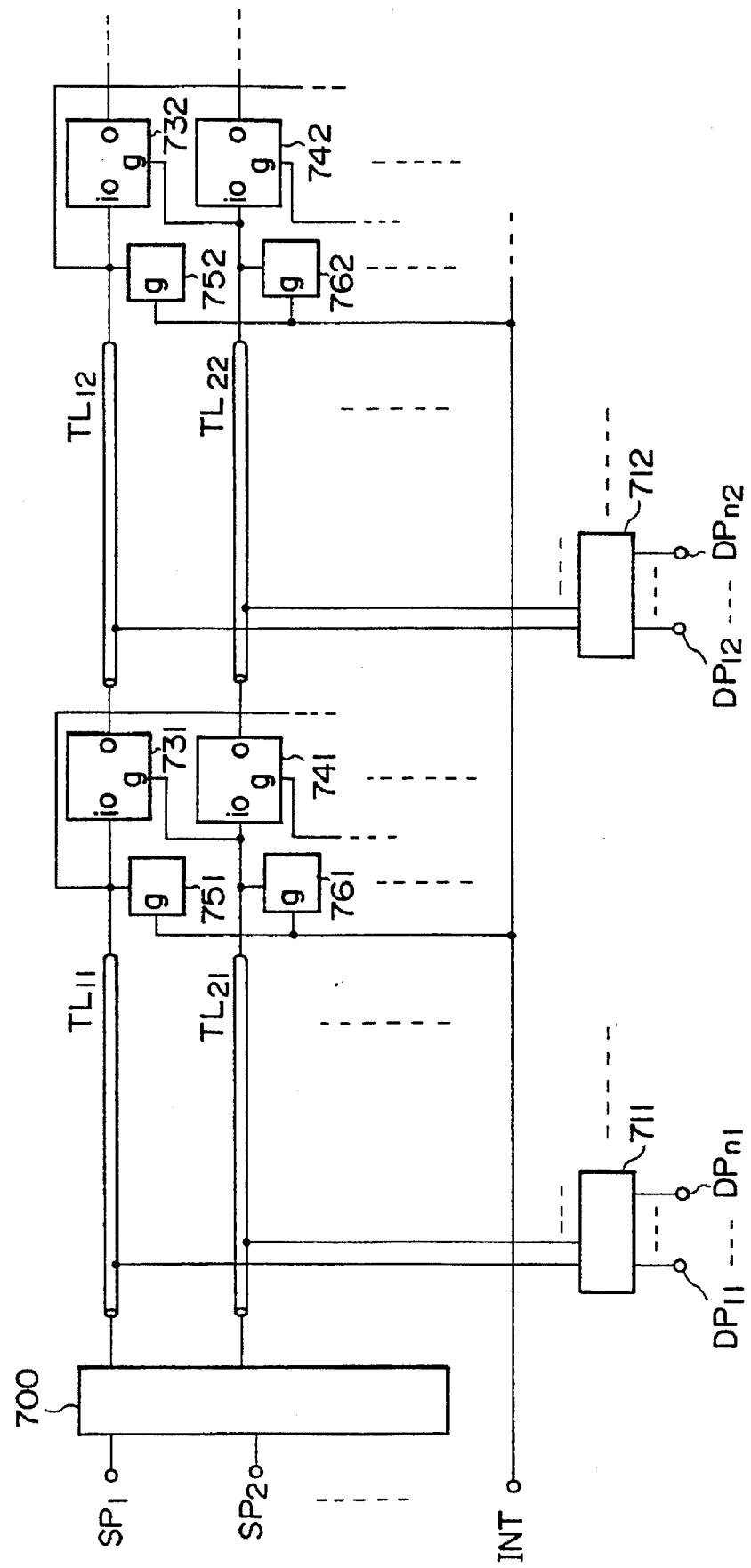
FIG. 19 is a circuit diagram illustrating an eighth embodiment of a digital signal transmission circuit according to the present invention.

An eighth embodiment will now be described with reference to the accompanying drawings. FIG. 19 is a circuit diagram showing the eighth embodiment of a digital signal transmission circuit according to the present invention.

The eighth embodiment relates to an improvement in the seventh embodiment shown in FIG. 17. Namely, the digital signal transmission circuit shown in FIG. 19 has a phase converting circuit 700, phase decoding circuits 711 and 712 and divided transmission lines $TL_{11}$ and $TL_{12}$ and $TL_{21}$ and $TL_{22}$. However, waveform shaping circuits 731, 732, 741 and 742 and initialization circuits 751, 752, 761 and 762 shown in FIG. 19 are provided in the eighth embodiment as an alternative to the inverters 621, 622, 631 and 632 employed in the seventh embodiment. Namely, the waveform shaping circuits and the initialization circuits are provided between all divided transmission lines. Any one of the waveform shaping circuits shown in FIGS. 7, 10, 12, 13 and 14 may be used as each of the waveform shaping circuits employed in the eighth embodiment. The waveform shaping circuit 731 is provided between the transmission lines $TL_{11}$ and $TL_{12}$. An input/output terminal io of the waveform shaping circuit 731 is electrically connected to the transmission line $TL_{11}$ and an output terminal o thereof is electrically connected to the transmission line $TL_{12}$. A control terminal g of the waveform shaping circuit 731 is electrically connected to the transmission line T21. Further, the initialization circuit 751, which is activated in response to a reset signal INT and brings the value of a voltage applied to the transmission line $TL_{11}$ to a low level, is electrically connected to the transmission line $TL_{11}$.

The digital signal transmission circuit according to the eighth embodiment is identical in operation to that according to the seventh embodiment. In the eighth embodiment, each of the waveform shaping circuits supplies a power source voltage Vcc to its corresponding transmission line when the value of the voltage applied to the transmission line rises, whereas each of the waveform shaping circuits supplies a voltage Vss to its corresponding transmission line when the value of the voltage applied to the transmission line falls, as in the third and fourth embodiments.

Thus, the eighth embodiment can bring about the same advantageous effect as that obtained in the seventh embodiment. Further, the transition of each transmission line can be accelerated. Since a period required to effect a level transition of a signal on each of divided transmission lines is longer than a pulse width of an input pulse signal, a feedback circuit provided within each waveform shaping circuit can be reliably controlled even in the case of the transmission of a pulse signal having a short pulse width. It is thus possible to transmit pulse signals at a higher speed.

Incidentally, the present invention is not necessarily limited to the structures of the above embodiments. Various modifications can be made to the above embodiments without departing from the scope of the invention. For example, the polarity of the clock terminal of each of the flip-flops of the phase converting circuits employed in the first and second embodiments may be set as negative so that the input pulse signal becomes a negative pulse signal. A signal output from a phase decoding circuit can generate a positive pulse signal. Further, negative EXORs with negative pulse signals as input may be used as an alternative to the EXORs forming the phase decoding circuits so as to output positive pulse signals therefrom. Furthermore, the value of the voltage applied to each of the transmission lines may be set to a high level at the time of its initial setup. It is however necessary to replace the NMOSs of the initialization circuits employed in the above embodiments with the PMOSs thereof and make an exchange between the voltages Vcc and Vss.

What is claimed is:

1. A digital signal transmission circuit for transmitting an input pulse signal to receiving circuits through transmission lines, comprising:

a phase converting circuit for receiving the input pulse signal and providing:

a first output signal having a potential level transition thereof according to a transition of a potential of the input pulse signal from a first level to a second level, and a second output signal having a potential level transition thereof according to a transition of the potential of the input pulse signal from the second level to the first level;

a first line included in the transmission lines, for transmitting the first output signal;

a second line included in the transmission lines, for transmitting the second output signal; and a decoding circuit for receiving the first and second output signals from said first and second lines and providing a decoding signal corresponding to a delayed reception of the input pulse signal, having a potential level transition thereof according to the potential level transition of at least one of the first and second output signals.

2. The digital signal transmission circuit as claimed in claim 1, wherein said decoding circuit comprises an exclusive OR circuit for receiving the first and second output signals and for outputting said decoding signal.

3. The digital signal transmission circuit as claimed in claim 1, wherein said phase converting circuit comprises first and second flip-flops;

the first flip-flop receiving said input pulse signal and outputting said first output signal;

the second flip-flop receiving said input pulse signal and outputting said second output signal.

4. The digital signal transmission circuit as claimed in claim 1, wherein said phase converting circuit sets each of the potential levels of the first and second output signals to a predetermined potential level in response to a reset signal.

5. A digital signal transmission circuit for transmitting input pulse signals having kth and k+1 pulse signals, to receiving circuits through transmission lines, comprising:

n transmission lines, including kth and kth+1 lines respectively transmitting said kth and kth+1 pulse signals, wherein n and k are integers and k<n, the kth pulse signal being provided to a first end of the kth lines, the kth+1 pulse signal being provided to a first end of the kth+1 line; and n waveform shaping circuits including a kth waveform shaping circuit, said n waveform shaping circuits being coupled to second ends of said n transmission lines respectively, the kth waveform shaping circuit being activated according to a potential level on a kth+1 line for supplying a predetermined voltage to the kth line corresponding to a change in potential level of the kth pulse signal.

6. The digital signal transmission circuit as claimed in claim 5, wherein each of said n waveform shaping circuits has an input terminal for receiving a signal transmitted through one of said n transmission lines, an output terminal for outputting a signal corresponding to the signal received by said input terminal and a control terminal for receiving a signal transmitted through another one of said n transmission lines, and provides a first power source voltage at said input terminal in response to voltage applied at said output terminal and said control terminal.

7. The digital signal transmission circuit as claimed in claim 5, wherein a plurality of initialization circuits are respectively connected to corresponding ones of said n transmission lines, each of said initialization circuits supplying a second power source voltage to said transmission lines in response to a reset signal.

8. The digital signal transmission circuit as claimed in claim 7, wherein each of said n waveform shaping circuits has an input terminal for receiving a signal transmitted through one of said n transmission lines, an output terminal for outputting a signal corresponding to the signal received by said input terminal and a control terminal for receiving a signal transmitted through another one of said n transmission lines, and provides a first power source voltage to said input terminal in response to voltage applied to said output terminal and said control terminal.

9. The digital signal transmission circuit as claimed in claim 5, wherein each of said n waveform shaping circuits comprises first and second first-conduction type transistors electrically connected between a first power source for supplying the first power source voltage and said input terminal, third and fourth second-conduction type transistors electrically connected between a second power source for supplying the second power source voltage and said input terminal, and an inverter electrically connected between said input terminal and said output terminal, said first and third transistors being responsive to a voltage applied to said control terminal and said second and fourth transistors being responsive to a voltage applied to said output terminal.

10. The digital signal transmission circuit as claimed in claim 5, wherein each of said n waveform shaping circuits comprises a first-conduction type transistor electrically connected between a first power source and an input terminal for supplying a first power source voltage, a second-conduction type transistor electrically connected between a second power source and said input terminal for supplying a second power source voltage, a NAND circuit having inputs connected to a control terminal and an output terminal and providing an output for activating said first-conduction type transistor, a NOR circuit having inputs connected to said control terminal and said output terminal and providing an output for activating said second-conduction type transistor, and an inverter electrically connected between said input terminal and said output terminal.

11. The digital signal transmission circuit as claimed in claim 10, wherein each of said n waveform shaping circuits has an initialization circuit for supplying said first power source voltage to the output of said NAND circuit in response to a reset signal.

12. The digital signal transmission circuit as claimed in claim 10, wherein said NAND circuit of each of said n waveform shaping circuits receives a reset signal as an input.

13. The digital signal transmission circuit as claimed in claim 5, wherein each of said n waveform shaping circuits has an input terminal for receiving a signal transmitted through one of said n transmission lines, an output terminal for outputting a signal corresponding to the signal received by said input terminal and a control terminal operatively coupled through an inverter to said output terminal of another one of said n transmission lines.

14. The digital signal transmission circuit as claimed in claim 13, wherein a plurality of initialization circuits for respectively supplying a second power source voltage to said n transmission lines in response to a reset signal are provided so as to be connected to said n transmission lines.

15. The digital signal transmission circuit as claimed in claim 13, wherein a plurality of initialization circuits for respectively supplying a second power source voltage to control terminals of said n waveform shaping circuits in response to a reset signal are provided so as to be connected to said n transmission lines.

* * * * *